UNITED STATES PATENT OFFICE 2,389,097

PROCESS OF PREPARING PURIFIED CALCIUM PANTOTHENATE

Kurt Warnat, Basel, Switzerland, assignor to Hoffmann-La Roche Inc., Nutley, N. J., a corporation of New Jersey No Drawing. Application August 26, 1942, Serial No. 456,272. In Switzerland September 1, 1941

1 Claim. (Cl. 260—534)

For the purpose of obtaining calcium-d-pantothenate, d-pantothenic acid ester has been saponified by barium hydroxide, the barium salt converted into free pantothenic acid by addition of sulfuric acid and neutralised with calcium carbonate (The Journal of the American Chemical Society, vol. 62, year 1940, page 1789). This process is rather complicated, especially because it starts from d-pantothenic acid ester, which is difficultly preparable in large quantities. Meanwhile, it has been possible to obtain sodium-d-pantothenate in very pure form by condensation of β-alanin in sodium alcoholates with d(-)-α-hydroxy-β,β-dimethyl-γ-butyrolactone. If inorganic acids are used for the conversion of this pure sodium salt into the calcium salt, it is not possible to obtain a calcium pantothenate which is free from the sodium salt of the inorganic acid. If, for instance, a solution of sodium-d-pantothenate in absolute alcohol is reacted with the calculated quantity of absolute, alcoholic hydrochloric acid, the resulting sodium chloride does not separate quantitatively, so that the calcium salt obtained from the isolated pantothenic acid always contains about ¼ to ½ per cent of sodium chloride. Moreover, pantothenic acid thus liberated can never be neutralised quantitatively by calcium carbonate, since part of the free acid is esterified or lactonised by the action of mineral acid.

It has now been found that pure, crystallised calcium-d-pantothenate can be obtained if the pantothenic acid is liberated from an alcoholic solution of sodium-d-pantothenate by an organic acid, whose sodium salt is insoluble in alcohol, the precipitated sodium salt removed, the alcoholic solution of pantothenic acid diluted with water, the acid converted into the calcium salt and the calcium salt brought to crystallisation by heating after removal of the water from alcoholic solution.

In this manner, the sodium can be removed nearly quantitatively so that, at the highest, only traces thereof are still present in the calcium salt. The conversion into the calcium salt is almost quantitative, since there is little danger of esterification and lactonisation of the free pantothenic acid. For the conversion of sodium-d-pantothenate into calcium-d-pantothenate, the working-up can be started from ready-made sodium-d-pantothenate, but also from a solution which contains sodium-d-pantothenate as a result of the condensation of β-alanin, sodium alcoholates and d(-)-α-hydroxy-β,β-dimethyl-γ-butyrolactone.

The superiority of the new process over the process mentioned at the beginning is also proved by the greater purity of the calcium-d-pantothenate. The calcium-d-pantothenate obtained in accordance with the new process has a rotation of $\alpha_D^{20} = +27°$, crystallises in needles and is not hygroscopic, whereas the hitherto known calcium salt shows a rotation of $+24°$, being a microcrystalline powder.

Example 1

A solution of 190 parts by weight of anhydrous oxalic acid in 2000 parts by weight of absolute alcohol is added to a solution of sodium-d-pantothenate in 3000 parts by weight of absolute alcohol. The precipitating sodium oxalate is removed and the alcoholic solution of the free pantothenic acid treated with 3000 parts by weight of water and 250 parts by weight of calcium carbonate. The alcohol is evaporated in vacuo at a bath temperature of 50° C. and excess calcium carbonate removed by filtration after completion of the reaction. 193 parts by weight=98 per cent of the theoretical are used up. The aqueous solution of calcium-d-pantothenate is evaporated to a viscous sirup in vacuo. This sirup is taken up in 8000 parts by weight of absolute alcohol and the solution slightly heated, whereupon calcium-d-pantothenate precipitates in macrocrystalline form. The product is sucked off, washed with alcohol and the salt dried. The yield is 814 parts by weight=85.4 per cent of the theoretical; $\alpha_D^{20} = +26.8°$ in water. Further quantities of the calcium salt can be obtained from the mother liquor.

The sodium-d-pantothenate may be prepared by reacting a solution of 356 parts by weight of beta-alanin in the calculated quantity of sodium methylate with 520 parts by weight of d(-)-alpha-hydroxy-beta, beta-dimethyl-gamma-butyrolactone at a temperature of 25-30° C., permitting the reaction mixture to stand for one to two days, and evaporating the methyl alcohol in vacuo.

Example 2

48.2 parts by weight of sodium-d-pantothenate are dissolved by slight heating in 200 parts by weight of absolute alcohol and the sodium precipitated by addition of a solution of 10 parts by weight of anhydrous oxalic acid in 50 parts by weight of absolute alcohol. After removal of the sodium oxalate, the filtrate is treated with water and the pantothenic acid neutralised by addition of calcium carbonate. As soon as the reaction has come to an end, excess calcium carbonate is filtered off and the aqueous solution evaporated in vacuo. The remaining sirupy salt is dissolved in 300 parts by weight of absolute alcohol at 50° C. and seeded, whereupon crystallisation quickly occurs. The salt described in Example 1 is obtained. The yield amounts to 40.4 parts by weight=84.9 per cent of the theoretical; $\alpha_D^{20} = +27.4°$ in water.

It will be appreciated that in the practice of the invention in accordance with the foregoing examples, any excess of oxalic acid which may be present, for instance, as the result of employment of slightly impure sodium pantothenate, will be removed from the solution as calcium oxalate on the addition of the calcium carbonate.

I claim:

Process for the manufacture of a purified non-hygroscopic calcium salt of d-pantothenic acid comprising liberating the pantothenic acid from an alcoholic solution of sodium d-pantothenate by addition of an approximately equivalent amount of oxalic acid, removing the insoluble sodium oxalate by filtration, diluting the filtered alcoholic solution of pantothenic acid with water, converting the pantothenic acid into calcium pantothenate by the addition of calcium carbonate, whereby any excess of oxalic acid is removed from solution as insoluble calcium oxalate, filtering off the calcium oxalate and excess calcium carbonate, and evaporating the solution in vacuo.

KURT WARNAT.